Nov. 20, 1962 G. A. KELLEY 3,065,043

AIR PURIFICATION

Filed May 23, 1958

INVENTOR.
G. A. KELLEY
BY
Charles S. Haughey
his Agt.

Nov. 20, 1962 G. A. KELLEY 3,065,043

AIR PURIFICATION

Filed May 23, 1958 2 Sheets-Sheet 2

INVENTOR.
G. A. KELLEY
BY
Charles S. Haughey
atty.

3,065,043
AIR PURIFICATION
Gilbert A. Kelley, Toledo, Ohio, assignor, by mesne assignments, to Midland-Ross Corporation, Cleveland, Ohio, a corporation of Ohio
Filed May 23, 1958, Ser. No. 737,993
5 Claims. (Cl. 21—53)

This invention relates to the purification and sanitization of air by the use of water solutions of lithium chloride, and to a simple apparatus therefor which requires only a pump, and no controls, to operate continuously and effectively under varying conditions of the air treated. This application is a continuation-in-part of my application Serial No. 354,289, filed May 11, 1953, now abandoned.

For a consideration of what I believe to be novel and my invention, attention is directed to the following portion of this specification and the drawing and concluding claims thereof.

Most air carried bacteria, molds and the like micro-organisms, cannot exist in even relatively weak solution of lithium chloride. For example, at room temperatures, about 70° F., the *Bacillus subtilis*, a Gram-positive organism, grows in a 2.2% solution of lithium chloride, but does not grow in 2.3% solution thereof. E. coli, a Gram-negative organism, will grow in a 2.7% solution of lithium chloride, but will not grow in a 2.8% solution thereof. These organisms are commonly used as a standards in this type of investigations in the art.

Figure 2:
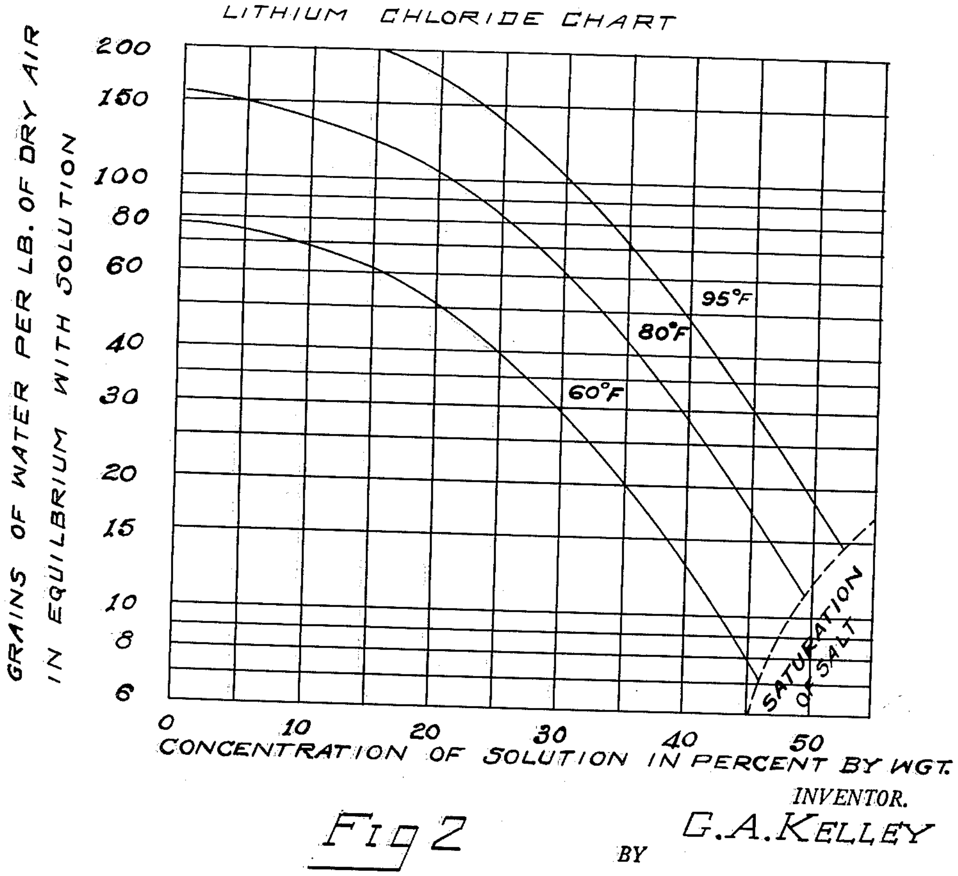
FIGURE 2 is a chart of solubility lithium chloride in water.

Lithium chloride is hygroscopic, and if left for an extended period of time in contact with atmospheric air, it will reach an equilibrium concentration of salt in the absorbed moisture according to the chart of FIGURE 2. In the winter time, in a room at 70° F. and having 11 grains per pound absolute moisture content, the concentration of lithium chloride in equilibrium therewith is about 45% and on a warm summer day, early in the morning, in an 80° F. room the equilibrium concentration of lithium chloride may be as low as about 12%; and in the afternoon of the same day the cencentration might rise to 26%. The range of equilibrium concentration to be expected in an enclosed living space over a year's time would be about from 12% to 45%.

If a solution of a fixed weight of lithium chloride salt in water were continuously recirculated over a contactor in contact with a stream of room air, the volume of solution circulating would vary up to about 3¾ times smallest volume found over a year's time due to the variation of water in the solution. Thus an air contacting unit operable with a solution content of 1.0 gallon of solution and having an operable capacity of up to about 3.75 gallons could be filled with 3¾ gallons of 12% solution, or one gallon of 45% solution, and it would thereafter always contain from one to 3¾ gallons of solution depending upon the temperature and moisture content of the air contacting the solution.

According to this invention, an unregenerated equilibrium solution of lithium chloride, i.e. a water solution thereof in equilibrium with atmosphere air, is continuously recirculated over an air-to-liquid contactor of a type used in air conditioning, and a stream of atmospheric air is circulated therethrough in contact with the solution.

Air borne micro-organisms and suspended solids such as microscopic particles of sand, metal, ashes, soot, fiber, chemicals, animal and vegetable matter, together with bacteria, mold spores, pollens and the like are carried into contact with the solution. The contactor has a bacteriostatic action, and the air borne micro-organisms in the air stream leaving the contactor depends primarily upon the efficiency of contacting the air stream with the solution in the unit. Generally speaking, removal of air borne micro-organisms parallels the moisture removal efficiency of the same contactor when used with concentrated, hygroscopic solution, and an air conditioner of a given design using concentrated hygroscopic solution which removes 95% of excess moisture from the air over the equilibrium humidity for the solution may remove 95% of the air borne bacteria, molds, and the like from the air in a single pass through the contactor. Obviously, if air from a room is continuously recirculated over an equilibrium solution of lithium chloride, the air in the room will be very rapidly depleted of its bacteria, molds, and the like, and will in time become sanitary, or substantially sterile, except for possible new contamination of the air.

This invention was tested by passing air from a sealed room through a lithium chloride solution to air contactor, and back into the room using *Serratia marcescens* as a test bacteria because it was not common to the area, is extremely small (about .25 micron), and because it provides characteristic red colonies on agar. The room volume was 981 cubic feet, substantially cubical, and tests were made by placing Petri dishes containing nutrient agar and Czapek media in the room on the floor, for varying periods, usually about 15 minutes, or in an air stream to or from the contacting unit for about 10 minutes, and the dishes were then incubated at 25° C. for three days, then bacteria and mold colonies were counted.

The effectiveness of the unit in the test procedure was tested by spraying *Serratia marcescens,* or red bacteria, into the inlet stream to the unit. The red count therefrom varied from 278 to 304 at the inlet to 10 to 39 at the outlet in one test. At a recirculation rate of 650 cubic feet per minute, test dishes exposed 15 minutes after spraying the bacteria into the room showed no air-borne bacteria in the room, though the bacteria remained air-borne for three hours after spraying when the air circulation to the contactor was turned off.

When tests were run with a technician in, or entering, the room, it was practically impossible to remove all normal air carried bacteria and molds, but the count thereof decreased rapidly to a very small number. By setting two contacting units in series in an air stream, the efficiency of bacteria removal is increased from about 90% to about 98% under similar conditions. When the solution is only sprayed across an air stream without the use of an air-liquid contact surface, the effectiveness of the process is noticeably reduced, which parallels dehumidifying experience in air conditioning.

The mechanism by which air-borne micro-organisms, dust and the like are absorbed is different than that by which moisture is absorbed by a hyrgoscopic solution, and is beginning to be understood. In humidity control apparatus using hygroscopic solutions, it can be shown that the approach to equilibrium of the humidity in the treated air (to the equilibrium humidity for the solution) is a function of wetted surface for contacting the air stream and contact time. In removal of air-borne micro-organisms, other factors are more important. It is believed at present that an impingement effect is required to initially capture practical fraction of dust, micro-organisms and the like from the air stream.

An equilibrium concentration of lithium chloride will have a bacteriostatic action over a wide range of atmospheric conditions. The value of a really effective, yet simple, bacteriostatic air treating device in producing near-sterile air is very great where it is desired to avoid contamination and spoilage of food, mold growth, spread of disease and the like.

Figure 1:
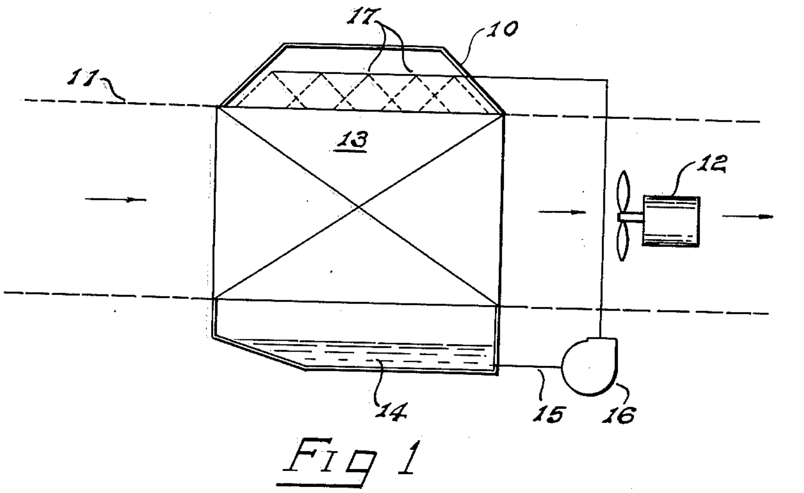
FIGURE 1 is a diagrammatic representation of apparatus according to, and for practicing this invention.

A simple apparatus for sterilization of air in an enclosed space is illustrated in FIGURE 1 of drawing where an air treating unit comprising a casing 10 is inserted in an air duct 11 through which air is caused to flow by a fan mechanism 12. An air to liquid contactor 13 is disposed in the casing, and an equilibrium lithium chloride solution is circulated from a sump 14 in the lower portion of the casing through a conduit 15 by a pump 16 to nozzles 17 in the upper portion of the contactor. The solution flows by gravity over the contactor in intimate contact with air flowing therethrough. Air carried bacteria in the air entering the contactor are largely removed; only about 1 to 10 percent of the bacteria by count pass through the contactor in a single pass of air, and upon recirculation of air from an enclosure through the contactor, the bacteria count of the air in the enclosure is reduced to substantially zero.

Figure 3:
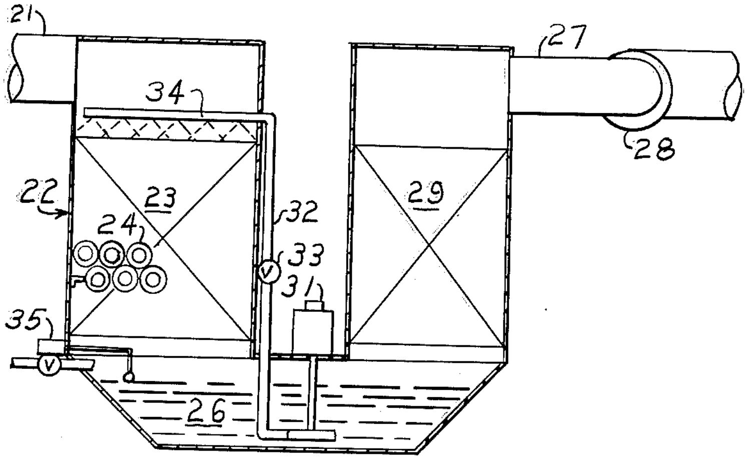
FIGURE 3 is a diagrammatic representation of alternate apparatus.

Alternate apparatus is shown in FIGURE 3 in which air to be treated enters an inlet duct 21, passes into a contactor 22 and passes downwardly through an extended surface 23 therein consisting of alternate staggered rows of finned tubes 24 with small baffles 25 adjacent alternate rows to prevent by-passing or channeling of the air stream. The air passes from the surface 23 across the surface of a sump 26 and upwards through a bed of berl saddles 29 serving as a mist eliminator, and thence through an outlet duct 27 and fan 28.

A pump 31 continuously circulates solution from the sump 26 through pipe 32 and valve 33, to deliver the solution through distributing nozzles 34 on to the top of the extended surface 23. The volume of solution recirculated will be substantally constant and sufficient to maintain the extended surface 23 fully wetted.

As with the apparatus shown in FIGURE 1 the volume of solution in the apparatus of FIGURE 3 as described will vary by a factor of about 1 to 3¾ over a year's time in normal living spaces, while the solution concentration varies from about 45% lithium chloride to about 12% lithium chloride. It has been found that the capture efficiency of the solution is somewhat improved at lower concentrations and accordingly a level control 35 may be added to admit fresh water, preferably steam condensate or dimineralized water sufficient to maintain the solution more dilute, say about 5% to 25%. This is especially true where, as in a hospital operating room, it is necessary to maintain a minimum humidity as well as to control levels of air-borne bacteria, and a concentration of about 8 to 10% lithium chloride is preferred. This, from FIGURE 2, would deliver air at 80° F. having about 135 grains per pound of dry air at equilibrium.

Lithium chloride solutions are not the only known example of bacteriostatic solutions which, being salt solutions, have no carry out problems due to vapor pressure losses, and yet are so peculiarly hygroscopic as to maintain the bacteriostatic properties in equilibrium with atmospheric air over the complete range of experience in normal living enclosures. Zinc chloride is bacteriostatic to *E. coli* and to *Bacillus subtilis* at concentration of 0.1%, and is in equilibrium with 70° F., 11 grain air at 75% solution concentration, and with warm summer air this solution will dilute to 30%, so zinc chloride theoretically would be an equivalent of lithium chloride. However, corrosion problems of zinc chloride solutions are so severe as to preclude their use at the present time.

Lithium bromide is a third salt which will remain liquid and hyrgroscopic and yet bacteriostatic in normal living atmospheres, its concentration varying from 59% in winter to 20% in summer limiting conditions, and it is bacteriostatic to *E. coli* at 5.8% concentration and to *Bacillus subtilis* at 5.5%. Due to special problems with this salt primarily its tendency to impart odor and color of bromine to air treated, its use is not yet practical.

Except for the primary drawbacks of corrosiveness for zinc chloride and of odor for lithium bromide, there are three compounds which are liquid, hygroscopic, and bacteriostatic solutions in equilibrium with air found in normal living enclosures and thus suitable for use as taught herein, lithium chloride being preferred as indicated.

Comparisons of solution of lithium chloride, lithium bromide and zinc chloride for their bacteriostatic properties show that where *E. coli* was used as a test bacteria, the concentrations at which growth was inhibited were:

| | Percent |
|---|---|
| Lithium chloride | 2.8 |
| Lithium bromide | 5.8 |
| Zinc chloride | 0.1 |

While the above tests were made on pure solutions from laboratory reagents, commercial lithium chloride may in fact contain small impurities of each of the other two; in fact where lithium chloride solution is used in a galvanized container, or in contact with a zinc surface, zinc chloride is formed by corrosive action, unless controlled, and several percent of zinc chloride may be present in the lithium chloride solution, as much as 8% in a 45% solution may be found in commercial air conditioners.

While equilibrium data must be adjusted for such impurities, the bacteriostatic effects are not reduced and in fact are improved.

While small impurities of calcium chloride or sodium chloride may be present, they are subject to salting out when used alone, and are not so effective in control of air-borne micro-organisms.

Saturated solutions of LiCl, NaCl, and CaCl were placed in beakers in an air stream, and the NaCl solution dried in 5 minutes, the calcium chloride solution dried overnight in less than 16 hours, and the lithium chloride solution reached constant volume in a few hours and remained so for over an entire weekend. In other test apparatus such a solution was continuously recirculated in an air stream in apparatus according to FIGURE 3 for over three months with no measurable loss of salt solution volume.

As has been noted above, the efficiency of contactor apparatus is a function of impingement, or capture, efficiency of the wetted surface in the unit. In a particular series of tests using the techinques described in volume LVI, Number 5, of the Ohio Journal of Science (September 1956 issue), pages 305 to 313, for the all-glass impinger noted on page 306 therein, which in the commercial version is accurate to 99% reproducable results, an air conditioning unit of the type shown in FIGURE 3 was tested with a lithium chloride solution of about 10%. The apparatus was tested at an air flow rating of 500 cubic feet per minute per square foot of effective air flow area through each row of finned coils. When so tested with a contact surface consisting of 7 rows of finned tubes 39.2% of air-borne micro-organisms passed through the unit. Upon retesting the unit at the same conditions except with 12 rows of finned tubes, 14.4% passed through the unit, and with 18 rows of tubes only 2.5% passed through.

Figure 4:
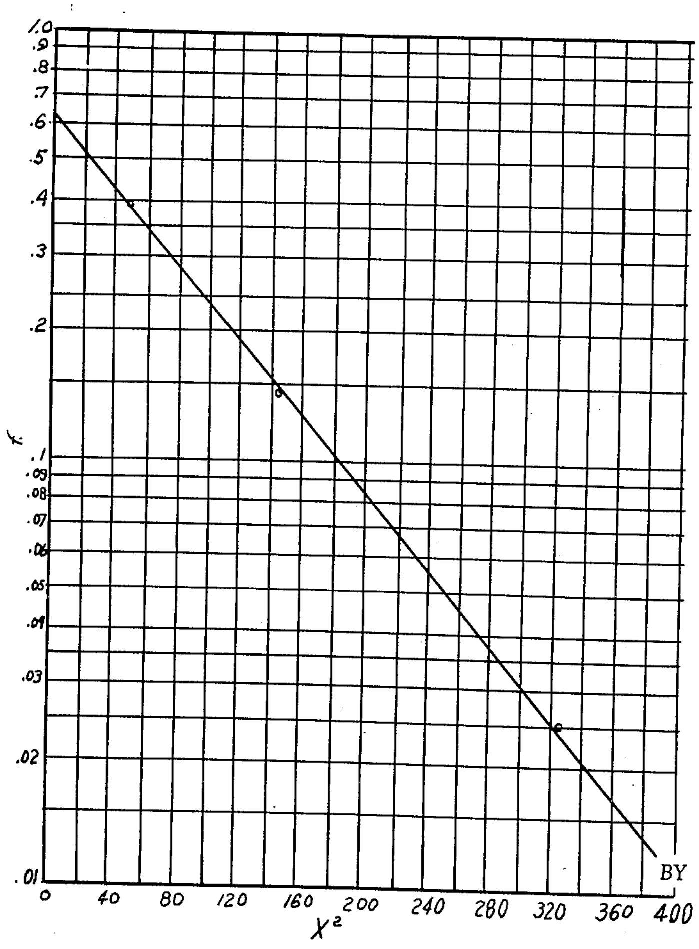
FIGURE 4 is a chart showing the relation of capture of micro-organisms to the number of rows of wetted coils, or the thickness of wetted filter.

The above data are plotted in FIGURE 4 showing the fraction passed vs the square of the number of rows of tubes, and fits a straight line curve. This may be written:

$$\ln f - \ln a = mx^2$$

where $f$=the fraction passed through the unit;
$a$=the fraction absorbed with no rows of tubes;

$x$=the number of rows of tubes, or the thickness of the wetted contact surface; and $m$=a constant.

The capture efficiency C.E. of the unit may thus be defined:

$$C.E.=100(1-f)$$

It has been found that the mechanism of capture of air-borne micro-organisms does not strictly parallel that of absorption of water vapor by a hygroscopic solution. In tests run on the same apparatus at near full, 95% air flow and at reduced, 23% air flow, the capture efficiency dropped from 96.3% to 93.3%, while the approach to humidity equilibrium with the hygroscopic solution increased from 90.0% to 97.0%. The improved approach to humidity equilibrium is explained by the increased contact time, the wetted surface remaining constant, but the change in capture efficiency requires other explanation.

Considering air-borne micro-organisms as solid particles, it is postulated that an impingement mechanism is involved in the capture of bacteria etc., by the solution. Thus a change of direction of the air stream tends to throw the organisms against the solution, where once captured they are not released to the air stream in a culturable form. If the data showed improved capture of larger organisms, this impingement effect would be considered as controlling, but in tests *Serratia marcesens*, having an average size reported as about 0.25 micron, were captured equally well as larger bacteria. Thus there seems not to be a pronounced separation of sizes captured at least in the size range of bacteria, molds and the like but several direction changes are important.

It is believed, however, that surface tension of the solution, or wettability of particles to be captured have some bearing on the efficiency of the unit. In tests on the natural flow of air in an office space, a test unit having 18 rows of wetted surface finned tubes was operated with the lithium chloride solution maintained at 10%, 21% and 45% in successive runs. Capture efficiencies of 97.5%, 96.6% and 96.2% respectively were obtained, with equal proportions of all micro-organisms found in the entering air stream being captured. The fraction passed by the 45% solution was .038, or 52% more than the fraction (.025) passed by the 10% solution. The impingement mechanism thus appears to operate on laws of probability, and not selectively for some organisms as against others.

While it was once considered by many to be essential to regenerate the lithium chloride solution to maintain its bacteriostatic action, a run of an equilibrium solution thereof averaging about 20% lithium chloride salt in an office summer-cooled atmosphere having a variety of air-borne micro-organisms, including pathogens, the capture efficiency of the test apparatus was 97.1% for a month of continuous operation, and during an additional two months additions of organisms were made directly to the solution to simulate the capture for 32 months, and during and at the end of the period the capture efficiency remained at 97%, plus or minus less than 1%. At the end of the run, solids from the solution sump were collected by filtration and washing, and repeated attempts to culture were fruitless.

It is now possible, with the apparatus and method herein described, to specify and maintain the bacteria, etc., count allowed in a room below measured levels by either fresh air passed through lithium chloride washer, or by recirculating air from the room therethrough, and to do so continuously with an unregenerated lithium chloride solution, with impurities of lithium bromide or zinc chloride if present. For the purpose of the following claims, the term "lithium chloride" shall accordingly mean lithium chloride with or without minor impurities, including zinc chloride and lithium bromide.

I claim:

1. A method for purifying air which consists in circulating a stream of a hygroscopic salt solution selected from the group consisting of lithium chloride, lithium bromide and zinc chloride solutions from a body thereof into contact with a surface and back to the body of the solution, the surface being wetted by the solution, circulating a stream of air from a source into impinging relationship with the wetted surface for purification, and delivering the resulting purified air into an enclosed space, whereby variations in moisture content in the air from the source cause variations in concentration of the salt solution.

2. A method for purifying air which consists in circulating a stream of lithium chloride solution from a body thereof into contact with a surface and back to the body of the solution, the surface being wetted by the solution, circulating a stream of air from a source into impinging relationship with the wetted surface for purification, delivering the resulting purified air into an enclosed space, and adding water to the circulated lithium chloride solution to maintain the concentration thereof substantially constant.

3. A method for purifying air which consists in circulating a stream of lithium chloride solution from a body thereof into contact with a surface and back to the body of the solution, the surface being wetted by the solution, circulating a stream of air from a source into impinging relationship with the wetted surface for purification, and delivering the resulting purified air into an enclosed space, whereby variations in moisture content in the air from the source cause variations in concentration of the lithium chloride solution.

4. A method for purifying air which consists in circulating a stream of lithium chloride solution from a body thereof into contact with a surface and back to the body of the solution, the surface being wetted by the solution, circulating a stream of air from a source into impinging relationship with the wetted surface for purification, delivering the resulting purified air into an enclosed space, and adding water to the circulated lithium chloride solution as required to maintain the concentration thereof between about 5 percent and about 25 percent.

5. A method for purifying air which consists in circulating a stream of a hygroscopic salt solution selected from the group consisting of lithium chloride, lithium bromide and zinc chloride solutions from a body thereof into contact with a surface and back to the body of the solution, the surface being wetted by the solution, circulating a stream of air from a source into impinging relationship with the wetted surface for purification, delivering the resulting purified air into an enclosed space, and adding water to the circulated salt solution as required to maintain the concentration thereof between about 5 percent and about 25 percent.

References Cited in the file of this patent

UNITED STATES PATENTS

| | | |
|---|---|---|
| 1,173,497 | Farley | Feb. 29, 1916 |
| 1,992,177 | Bichowsky | Feb. 26, 1935 |
| 2,129,275 | Hartzell | Sept. 6, 1938 |
| 2,171,400 | Lyon | Aug. 29, 1939 |
| 2,205,831 | Hartman | June 25, 1940 |
| 2,230,088 | Podbielniak | Jan. 28, 1941 |
| 2,683,074 | Kuehner | July 6, 1954 |

FOREIGN PATENTS

| | | |
|---|---|---|
| 3,170 | Great Britain | Aug. 3, 1880 |

OTHER REFERENCES

McCulloch: Disinfection and Sterilization, 1st ed., 1936, pp. 237–240.

Carswell: Ind. and Eng. Chem., vol. 29, No. 1, January 1937, pp. 85–89.

Chemical and Metallurgical Engineering 47(5), p. 303, May 1940 (reproduced in U.S. Patent No. 2,876,507).